US010810319B2

United States Patent
Amarendra et al.

(10) Patent No.: US 10,810,319 B2
(45) Date of Patent: Oct. 20, 2020

(54) SECURE RELEASE OF PRINT JOBS IN PRINTING DEVICES

(71) Applicant: Hewlett-Packard Development Company, L.P., Houston, TX (US)

(72) Inventors: Shakti Amarendra, Bangalore (IN); Sajal Kum Das, Bangalore (IN); Anuradha Asuri, Bangalore (IN); Krishnaswamy R, Bangalore (IN); Sivakami Velusamy, Bangalore (IN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/079,671

(22) PCT Filed: Dec. 2, 2016

(86) PCT No.: PCT/US2016/064669
§ 371 (c)(1),
(2) Date: Aug. 24, 2018

(87) PCT Pub. No.: WO2017/222586
PCT Pub. Date: Dec. 28, 2017

(65) Prior Publication Data
US 2019/0050586 A1 Feb. 14, 2019

(30) Foreign Application Priority Data
Jun. 25, 2016 (IN) .............................. 201641021865

(51) Int. Cl.
*G06F 21/60* (2013.01)
*G06F 21/62* (2013.01)
(Continued)

(52) U.S. Cl.
CPC .......... *G06F 21/608* (2013.01); *G06F 3/1222* (2013.01); *G06F 3/1237* (2013.01);
(Continued)

(58) Field of Classification Search
None
See application file for complete search history.

(56) References Cited

U.S. PATENT DOCUMENTS

2002/0051172 A1\* 5/2002 Nomura ................ G06F 3/1206
358/1.15
2003/0081788 A1 5/2003 Simpson
(Continued)

FOREIGN PATENT DOCUMENTS

EA  200800789 A1  2/2009

OTHER PUBLICATIONS

Lee, E. et al. A Secure NFC-Based Mobile Printing Service Using Recognition Robot, Feb. 24, 2015, http://www.hindawi.com/ ~ 5 pages.

*Primary Examiner* — Fan Zhang
(74) *Attorney, Agent, or Firm* — HP Inc. Patent Department (57) ABSTRACT

In one example, a method is disclosed in which a key is generated in a client device when a print job is triggered at the client device. The key and the print job are provided to a printing device. Further, a first thumbnail of a page of the print job is generated in the client device. The page is determined as a function of the key. A first secure image is generated in the client device using the key and the first thumbnail. The first secure image is shared with the printing device. The first secure image is verified by the printing device using the provided key and then the print job is released upon successful verification.

16 Claims, 8 Drawing Sheets

(51) Int. Cl.
*G06K 15/00* (2006.01)
*G06K 15/02* (2006.01)
*G06F 21/32* (2013.01)
*H04W 4/80* (2018.01)
*G06F 3/12* (2006.01)
*G06F 21/36* (2013.01)
*H04N 1/00* (2006.01)

(52) U.S. Cl.
CPC .............. *G06F 21/32* (2013.01); *G06F 21/36* (2013.01); *G06F 21/62* (2013.01); *G06K 15/1856* (2013.01); *G06K 15/4095* (2013.01); *H04N 1/00352* (2013.01); *H04W 4/80* (2018.02)

(56) References Cited

U.S. PATENT DOCUMENTS

| | | | |
|---|---|---|---|
| 2003/0151631 A9 | 8/2003 | Miyata et al. | |
| 2004/0075746 A1 | 4/2004 | Takamine et al. | |
| 2009/0237713 A1 | 9/2009 | Ebisawa et al. | |
| 2011/0090534 A1* | 4/2011 | Terao | G06Q 10/10 358/1.15 |
| 2013/0083337 A1* | 4/2013 | Tecu | G06F 3/1204 358/1.13 |
| 2013/0128306 A1 | 5/2013 | Takahashi | |
| 2013/0194623 A1* | 8/2013 | Tecu | G06F 3/1204 358/1.15 |
| 2014/0293314 A1 | 10/2014 | Amarendra et al. | |
| 2016/0006862 A1* | 1/2016 | Park | H04M 1/72577 455/411 |

\* cited by examiner

SECURE RELEASE OF PRINT JOBS IN PRINTING DEVICES

BACKGROUND

In a networked environment, a printing device may be shared by a plurality of client devices. In such cases, print jobs may either be stored in a print job queue or printed immediately. For instance, in a shared printing device, the print job requested by one user may be accessible to other users.

BRIEF DESCRIPTION OF THE DRAWINGS

Examples are described in the following detailed description and in reference to the drawings, in which.

DETAILED DESCRIPTION

In a networked environment where a printing device is shared by a plurality of client devices, a print job stored in a print job queue may need to be protected from unauthorized access. Some example methods to release the print jobs from the printing device may be based on security mechanisms such as a personal identification number (PIN)/password, swiping access card, using biometric identification of users or the like. In case of a PIN/password security mechanism, a user may need to memorize the PIN/password. Further, use of authentication accessories, such as swiping access cards or biometric identification, may need extra hardware and network-based authentication which may consume time and cost.

Examples described herein may facilitate a secure release of a print job in a printing device based on authentication of a generated secure image. In one example, a key (e.g., random number) may be generated in a client device when the print job is triggered at the client device. A page of the print job may be determined as a function of the key. Further, a first thumbnail of the determined page may be generated in the client device. Then, the key may be encoded and the encoded key may be embedded within the first thumbnail to generate a first secure image in the client device. The first secure image may be displayed on the client device or stored in memory associated with the client device (e.g., to release the print job at a later point in time). Depending on whether the client device is a mobility device or not, the user might be prompted to securely transfer the first secure image to a portable device which can be carried to the printing device. The generated key is communicated to the printing device along with the print job.

Furthermore, the printing device may receive the key and the print job from the client device. The printing device may determine the page of the received print job as the function of the received key and may generate a second thumbnail of the determined page. The printing device may generate a second secure image by encoding the received key and embedding the encoded key into the second thumbnail. For example, the printing device may use substantially same techniques as used in the client device to generate the second thumbnail and the second secure image. For example, the client device and the printing device may include a steganography technique to generate the first secure image and second secure image, respectively. The second secure image along with the print job may be stored in a print job queue associated with the printing device.

When the user requests a release of the print job, the user may either be prompted to share the first secure image with the printing device or in case of a printing device having capability of auto-scan, the printing device may auto-scan the first secure image for comparison with the repository of thumbnails associated with print jobs in the print job queue. In one example, the user may share the first secure image from the mobility device (e.g., client device or portable device) to the printing device using a mutually supported transmission media such as, but not limited to, a wired connection, a Wi-Fi connection, a near field communication (NFC), Bluetooth, image capturing device, or a scanner or any other communication channels. The printing device may compare the first secure image with the second secure image and release a corresponding print job from the print job queue when the first secure image matches with the second secure image.

Examples described herein may provide an enhanced level of security while releasing the print job. For example, examples described herein may provide the enhanced level of security by generating a unique key (e.g., random number) and a unique secure image corresponding to each print job. Further, examples described herein may enable usage of displays of client devices to display the first secure image for scanning by the printing device, without a need to carry any extra hardware.

Figure 1A:
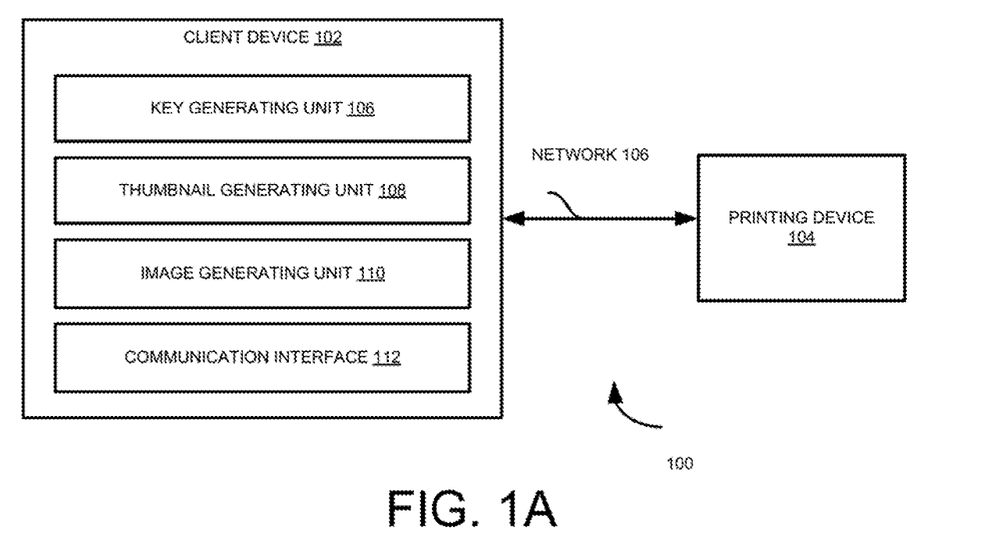
FIG. 1A is a block diagram of an example network environment including a client device and a printing device.

FIG. 1A is a block diagram of an example network environment 100 depicting a client device 102 communicatively coupled to a printing device 104. Example network environment 100 of FIG. 1A is illustrated using one client device and one printing device, however, network environment 100 may include multiple printing devices and multiple client devices, such that each printing device may be shared by corresponding client devices. For example, a printing device may be shared by a set of client devices using a corresponding printer driver that is either installed in or accessible to the set of client devices. Examples of client device 102 may include, but not limited to, a cellular phone, a laptop, a desktop, a mainframe computer, a smartphone, a personal digital assistant (PDA), an Internet of Things (IoT) device and other devices capable of triggering the print job for printing. The term "printing device" may refer to any image forming apparatus that accepts print jobs from client devices and store the print jobs in a print job queue for printing. The client device 102 may be communicatively coupled to printing device 104 via a network 106. Example network 106 may include local area network, a wireless network, a wide area network, a peer-to-peer network, or a hard-wired connection.

Client device 102 may include a key generating unit 106 a thumbnail generating unit 108, an image generating unit 110, and a communication interface 112. During operation, key generating unit 106 may generate a key corresponding to a print job when the print job is requested by client device 102 (e.g., when a user gives a print via client device 102). Example key may include a random number, text, and/or image. In one example, the key may be generated using at least one of a time stamp, Internet protocol (IP) address, and/or identifiers associated with client device 102. In one example, a random number may be generated as a function of information such as a timestamp, an IP address of client device 102, and/or identifiers associated with client device 102. Example function may include an operation rand ( ).

Further, thumbnail generating unit 108 may select a page of the print job based on the key and generate a first thumbnail of the selected page. Example first thumbnail may be a low resolution snapshot of an image of the selected page. In an example, a page of the print job may be selected as a function of the key. Example function may include a mathematical modulus operation, where the key and a number of pages of the print job are provided as input to the mathematical modulus operation.

Further, image generating unit 110 may generate a first secure image using the key and the first thumbnail. In one example, image generating unit 110 may encode the key and embed the encoded key into the first thumbnail, for instance, using a steganography technique to generate the first secure image. The first secure image may be displayed on a screen of client device 102 and/or stored in memory of client device 102. Further, communication interface 112 may send the key and the print job to printing device 104 for printing. For example, when client device 102 receives a print request, the operating system (OS) may execute printer drivers corresponding to printing device 104, so that the print job passed from an application is translated to printing commands executable by printing device 104. In an example, the key may be sent rough a secure communication channel.

Further, communication interface 112 may share the first secure image with printing device 104. In one example, the first secure image may be shared from client device 102 to printing device 104 using mutually supported transmission media. Example transmission media may include, but not limited to, a Wi-Fi connection, a Near Field Communication (NFC), a Bluetooth, an image capturing device such as a camera, a scanner, or a wired connection such as Universal Serial Bus (USB) cable. In one example, the first secure image displayed on display screen of client device 102 may be shared to printing device 104 through the scanner of the printing device 104. In this case, the first secure image can be scanned by placing display screen of client device 102 on the scanner bed of printing device 104. In another example, the first secure image may be captured by the camera installed in printing device 104. Example sharing of the first secure image from client device 102 to printing device 104 is explained in FIG. 1B.

Figure 1B:
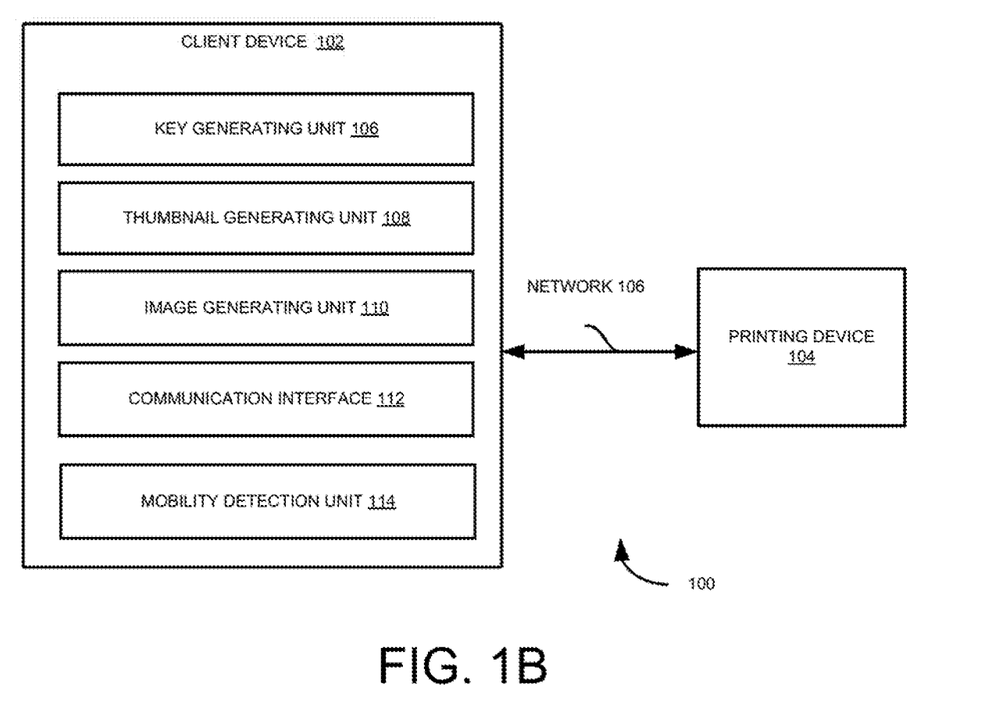
FIG. 1B is a block diagram of the example network environment of FIG. 1A illustrating additional components of the client device.

FIG. 1B is a block diagram of the example network environment 100 of FIG. 1A illustrating additional components of client device 102. In the example shown in FIG. 1B, client device 102 may further include a mobility detection unit 114 to determine whether client device 102 is a mobility device which can be physically carried near printing device 104 for releasing of the print job. Example mobility device may include smartphones, tablets or the like. In one example, mobility detection unit 114 may determine whether client device 102 is the mobility device based on a combination of parameters such as a display screen size of client device 102 in comparison with a scanner bed of printing device 104, OS of client device 102, a mobile device identifier, and type of in-built motion sensors of client device 102.

In one example, when client device 102 is the mobility device such as a smart phone, mobility detection unit 114 may enable to share the first secure image to printing device 104 using client device 102. In another example, when client device 102 is a main frame or desktop computer which is not the mobility device, mobility detection unit 114 may prompt to transfer the first secure image from client device 102 to a portable device 302 (as shown in FIG. 3) and then the first secure image may be shared to printing device 104 using portable device 302. Used herein the terms "mobility device" and "portable device" may refer to devices that can be physically carried near/to printing device 104. Example determination of the mobility capability of client device 102 based on the combination of parameters is explained using FIG. 2.

Figure 2:
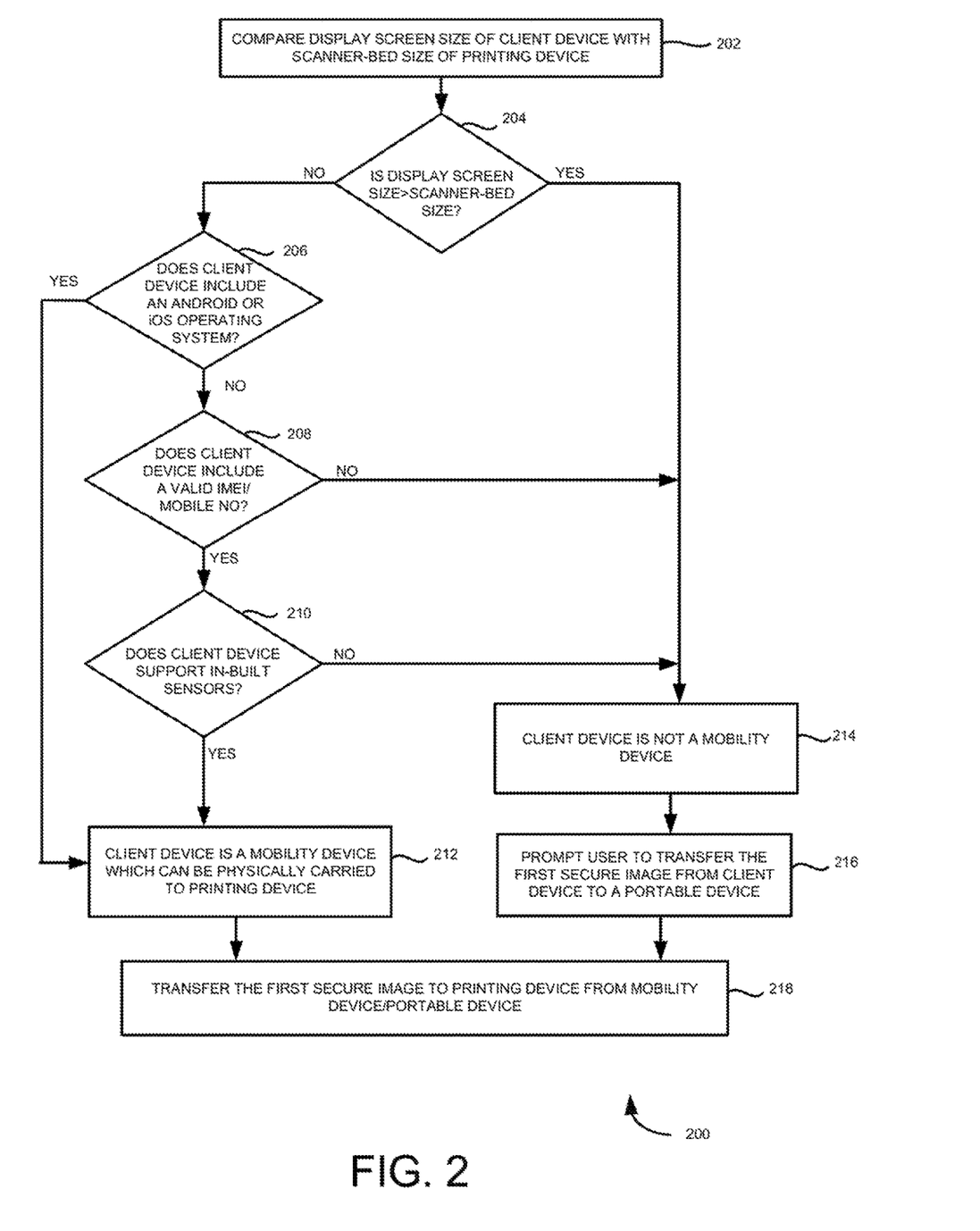
FIG. 2 depicts an example flowchart to detect a mobility capability of the client device.
Figure 3:
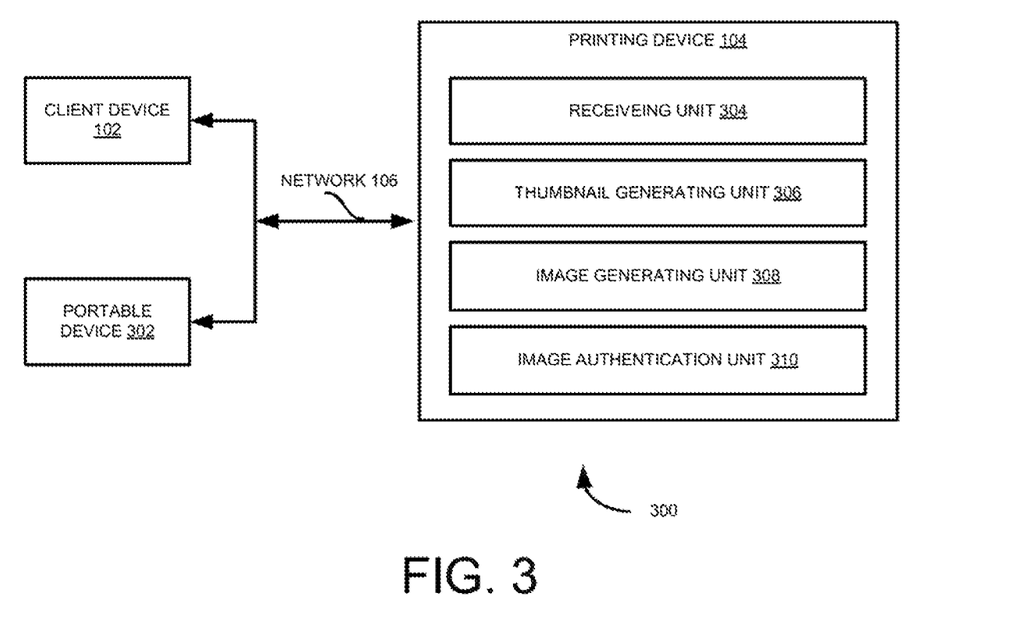
FIG. 3 is a block diagram of an example printing device to securely release print jobs.

FIG. 2 depicts an example flowchart to determine the mobility capability of client device 102. At 202, the display screen size of client device 102 may be compared with a scanner bed size of printing device 104 by mobility detection unit 114. In one example, scanner bed size of printing device 104 may be queried by invoking an application programming interface (API) call in client device 102. Example API call may include Get-UI-Attributes or Look-An-Feel-Id that may be used to obtain information associated with size, resolution of the device (e.g., printing device) for which the query is invoked.

At 204, a check is made to determine whether the display screen size is greater than the scanner bed size based on the comparison. When the display screen size is greater than the scanner bed size, the process goes to 214. When the display screen size is smaller than the scanner bed size, at 206, a check is made to determine whether client device 102 includes mobility device OS such as Android or iOS. When client device 102 includes Android or iOS, then the process 200 proceeds to 210. When client device 102 does not support the mobility device OS, then the process 200 proceeds to 208, in which a check is made to determine whether client device 102 has a valid mobile device identifier. Example mobile device identifier may include an International Mobile Station Equipment Identity (IMEI), an International Mobile Subscriber Identity (IMSI), or a Mobile Equipment Identifier (MEID). When client device 102 does not have a valid mobile identifier, then the process goes to 214.

When client device 102 has the valid mobile device identifier, at 210, a further check is made to determine whether client device 102 has in-built motion sensors. Example motion sensors may include sensors such as an accelerometer, magnetic compass, magnetometer or gyroscope that are used to detect orientation and motion of client device 102. When client device 102 has in-built motion sensors, then the process goes to 212. When client device 102 does not have in-built motion sensors, then the process goes to 214.

At 212, client device 102 may be determined as the mobility device which can be carried to printing device 104 and the process goes to 218. At 214, client device 102 may be determined to be not the mobility device, and the process goes to 216. At 216, the user may be prompted to transfer the first secure image from the client device 102 to a portable device, which can be carried to printing device 104. At 218, the first secure image may be transferred from client device 102 (e.g., mobility device) or portable device to printing device 104 using one of a wired connection, a Wi-Fi connection, a near field communication (NFC), Bluetooth, an image capturing device and scanner.

The checks performed in blocks 206, 208 and 210 may improve the mobility capability detection of client device 102. For example, the client device such as a main frame computer may have display screen size smaller than the scanner bed size. However, the main frame computer may not be the mobility device. In this case, the mobility capability of the main frame computer may be determined based on the checks performed in blocks 206, 208 and 210. In another example, client device 102 may be a smart phone having Windows OS, in such case, the mobility capability of client device 102 is determined by performing checks in 208 and 210. In yet another example, client device 102 may be a smart phone which does not support a subscriber identity module (SIM) card, in such case, the mobility capability of client device 102 is determined by performing checks in 210.

Referring now to FIG. 1A, printing device 104 may verify the first secured image shared from client device 102 or portable device using the key received from client device 102. The verification of the first secured image is explained in detail in FIG. 3. FIG. 3 is a block diagram of an example network environment 300 illustrating an example printing device to securely release print jobs. As shown in FIG. 3, printing device 104 may include a receiving unit 304, a thumbnail generating unit 306, an image generating unit 308, and an image authentication unit 310.

During operation, receiving unit 304 may receive the key and the print job from client device 102 via a secure communication. Thumbnail generating unit 306 may generate a second thumbnail of the page of the print job received. In one example, the page may be determined as a function of the key. Further, image generating unit 308 may generate a second secure image using the second thumbnail and the key.

Furthermore, image authentication unit 310 may obtain the first secure image associated with the print job from client device 102 (when client device 102 is a mobility device) or from a portable device 302 (when client device 102 is not the mobility device). Image authentication unit 310 may compare the first secure image with the second secure image to verify the first secure image associated with the print job. If the first secure image matches with the second secure image, image authentication unit 310 may release the corresponding print job. In one example, when a user wants to release the print job, user may take the mobility device containing the first secure image to printing device 104 and share the first secure image via scanning the first secure image by placing the mobility device having the first secure image in the scanner bed of printing device 104, NFC, Bluetooth, or camera capture. In one example, a tolerance factor may be taken into account while comparing the first secure image with the second secure image. Used herein, the tolerance factor may be a parameter for compensating a data loss that is occurred while transferring the first secure image to printing device 104.

As described in FIG. 3, the functions/programs/techniques implemented in printing device 104 for generating the second thumbnail and associated second secure image may be substantially similar to the functions/programs/techniques implemented in client device 102 for generating the first thumbnail and associated second secure image.

In one example, the components of client device 102 and printing device 104 may be implemented in hardware, machine-readable instructions or a combination thereof. In one example, each of key generating unit 106, thumbnail generating unit 108, image generating unit 110, communication interface 112 and mobility detection unit 114 of client device 102 and receiving unit 304, thumbnail generating unit 306, image generating unit 308, and image authentication unit 310 of printing device 104 may be implemented as engines or modules comprising any combination of hardware and programming to implement the functionalities described herein. Even though FIGS. 1A and 1B describe about client device 102, the functionality of the components of client device 102 may be implemented in other electronic devices such as personal computers (PCs), server computers, tablet computers, mobile devices and the like.

Client device 102 and printing device 104 may include computer-readable storage medium comprising (e.g., encoded with) instructions executable by a processor to implement functionalities described herein in relation to FIGS. 1-3. In some examples, the functionalities described herein, in relation to instructions to implement functions of components of client device 102 and printing device 104 and any additional instructions described herein in relation to the storage medium, may be implemented as engines or modules comprising any combination of hardware and programming to implement the functionalities of the modules or engines described herein. The functions of components of client device 102 and printing device 104 may also be implemented by the processor. In examples described herein, the processor may include, for example, one processor or multiple processors included in a single device or distributed across multiple devices.

Figure 4A:
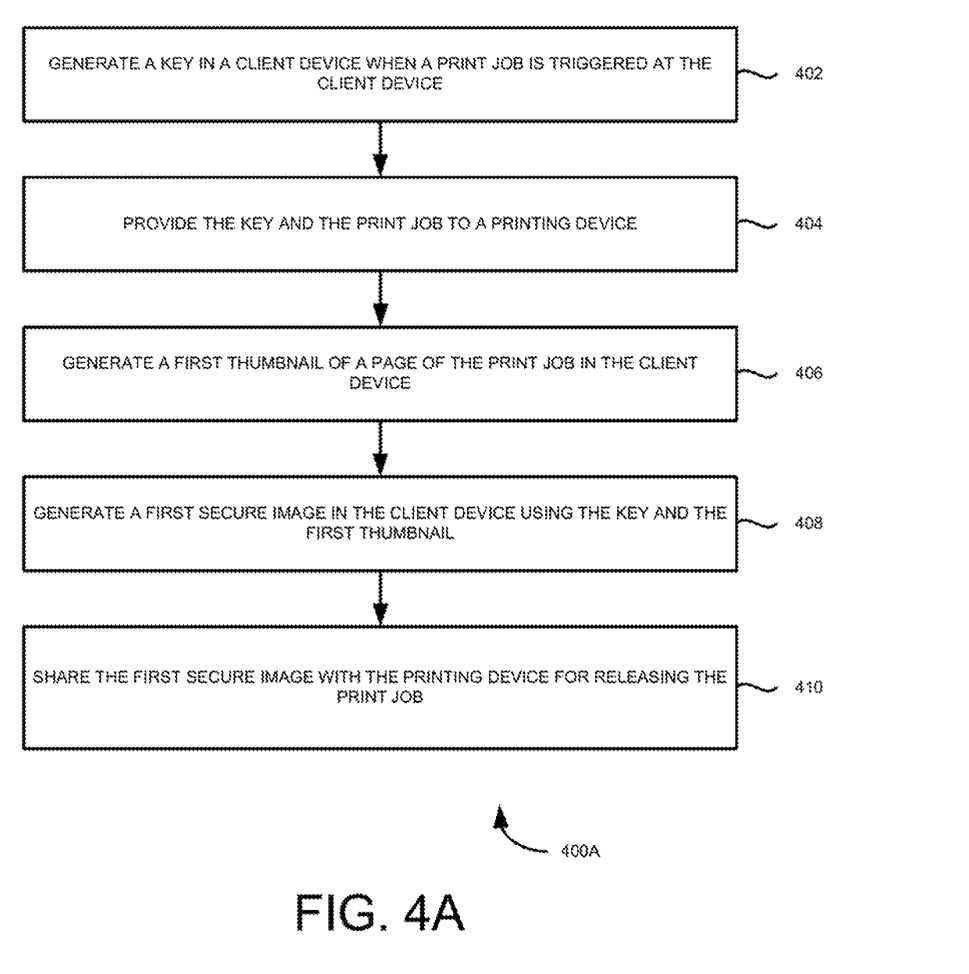
FIG. 4A and FIG. 4B depict example flow charts to securely release print jobs from a printing device.
Figure 4B:
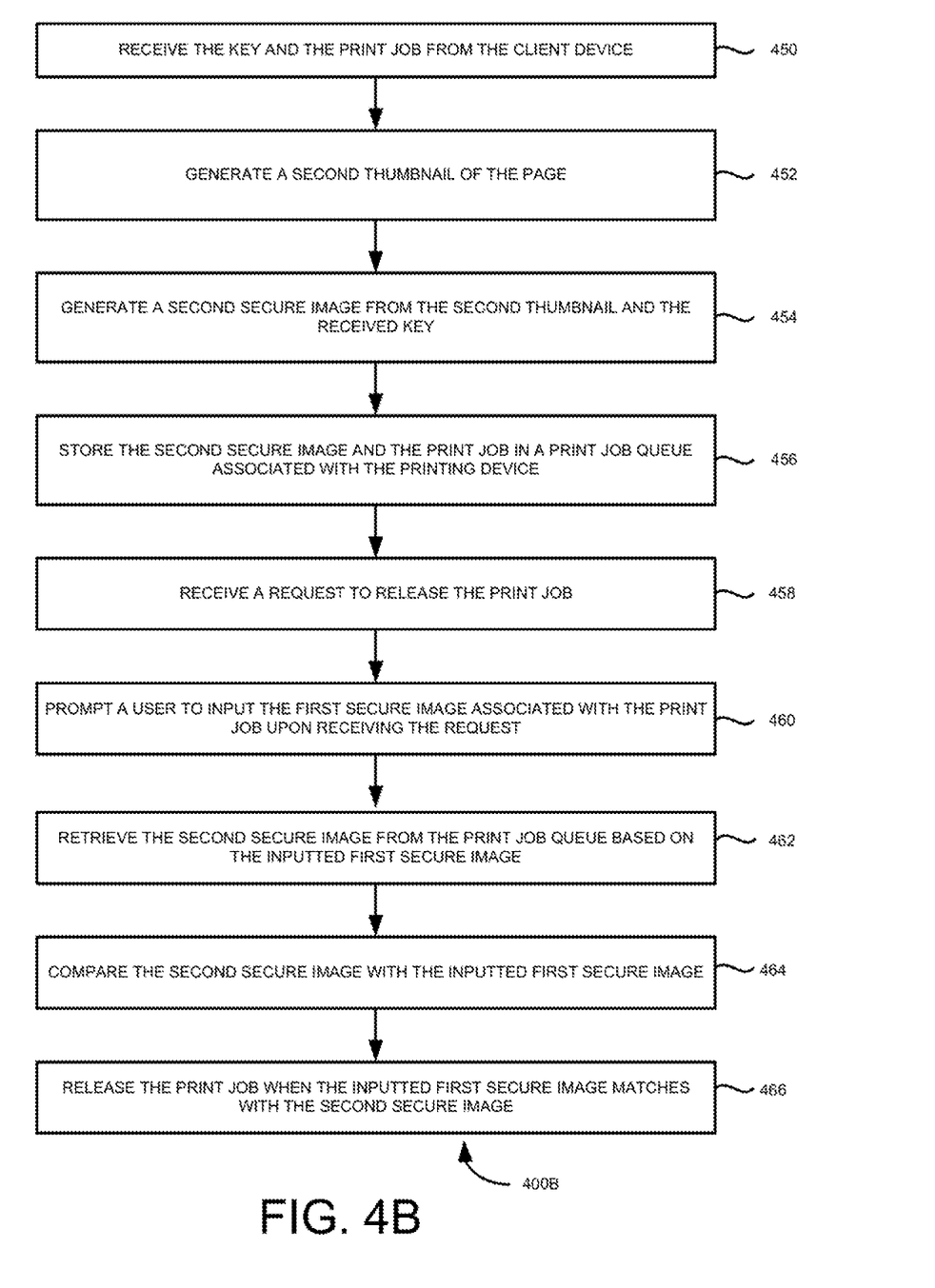

FIGS. 4A and 4B depict example flow charts to securely release print jobs from a printing device. It should be understood the process depicted in FIGS. 4A and 4B represent generalized illustrations, and that other processes may be added or existing processes may be removed, modified, or rearranged without departing from the scope and spirit of the present application. In addition, it should be understood that the processes may represent instructions stored on a computer readable storage medium that, when executed, may cause a processor to respond, to perform actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design or fabricate circuits, generate machine-readable instructions, or use a combination of hardware and machine-readable instructions to perform the illustrated processes.

At 402, a key may be generated in a client device when a print job is triggered at the client device. At 404, the key and the print job may be provided to a printing device. At 406A, a first thumbnail of a page of the print job may be generated in the client device. The page may be determined as a function of the key. At 408, a first secure image may be generated in the client device using the key and the first thumbnail.

At 410, the first secure image may be shared with the printing device. In one example, the first secure image may be shared by detecting a mobility capability of the client device. In one example, the mobility capability of the client device may be determined based on a combination of parameters such as a display screen size of the client device in comparison with a scanner bed of the printing device, OS of the client device, a mobile device identifier, and type of in-built motion sensors of the client device. Based on the detected mobility capability, the user may be prompted to select one of the client device and a portable device. Further, the first secure image may be shared with the printing device using the selected one of the client device and the portable device. The first secure image may be shared from the client device or the portable device to the printing device using a connection such as a wired connection, a Wi-Fi connection, a near field communication (NFC), Bluetooth, an image capturing device, and scanner.

Further, the shared first secure image may be verified by the printing device using the key as provided by the client device. Example method for verifying the first secure image using the printing device is explained in detail in FIG. 4B. Furthermore, the print job may be released upon successful verification.

FIG. 4B depicts method for verifying the first secure image using the printing device. At 450, the key and the print job may be received from the client device or the portable device by the printing device. At 452, a second thumbnail of the page (i.e., page of the print job) may be generated where the page may be selected as the function of the received key. At 454, a second secure image may be generated from the second thumbnail and the received key. At 456, the second secure image and the print job may be stored in a print job queue associated with the printing device. At 458, a request to release the print job may be received at the printing device. At 460, the user may be prompted to input the first secure image associated with the print job upon receiving the request by the printing device. At 462, the second secure image may be retrieved from the print job queue based on the inputted first secure image. At 464, the second secure image may be compared with the inputted first secure image. At 466, the print job may be released when the inputted first secure image matches with the second secure image.

The processes 400A and 400B of FIGS. 4A and 4B may show example processes and it should be understood that other configurations can be employed to practice the techniques of the present application. For example, processes 400A and 400B may communicate with a plurality of client devices, and portable devices in a shared networked environment.

Figure 5:
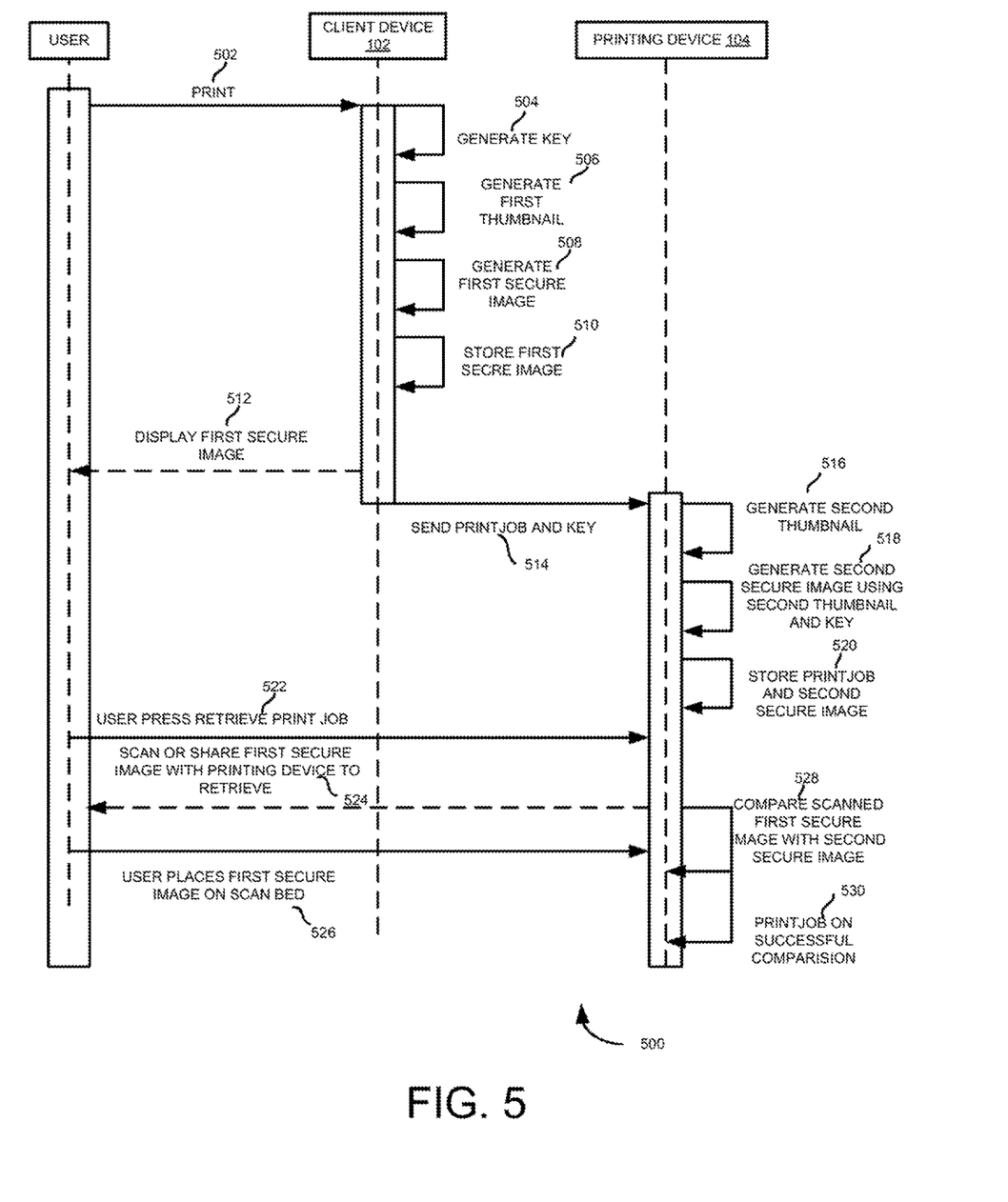
FIG. 5 depicts a timeline diagram showing sequence of events to securely release a print job from a printing device.

FIG. 5 depicts a timeline diagram 500 showing sequence of events to securely release of the print job from printing device 104. At 502, a print job may be triggered by a user at client device 102. At 504, a key may be generated at client device 102. At 506, a page of the print job may be selected as a function of the key and a first thumbnail of the page may be generated. At 508, a first secure image may be generated by encoding the key and embedding the key into the first thumbnail. At 510, the first secure image may be stored on client device 102. At 512, the first secure image may be displayed to the user.

Further at 514, the print job and the key may be sent to printing device 104. At 516, a second thumbnail of the page of the print job may be generated, in this case the page may be selected as the function of the key. The function may be substantially similar to the function used at client device, while generating the first thumbnail. At 518, a second secure image may be generated at the printing device using the second thumbnail and the key. At 520, the second secure image may be stored along with the print job in a print job queue. At 522, when a user presses a retrieve job application indicating a release of the print job, printing device 104, at 524, may prompt the user to share the first secure image. In one example, the first secure image may be retrieved from the client device while initiating printing operation and displayed on display screen of the client device. At 526, the user may place the first secure image (displayed on the client device) on a scan bed of printing device 104, to share the first secure image with printing device 104. At 528, the scanned first secure image may be compared with the stored second secure image. At 530, the print job may be executed upon a successful comparison of the first secure image with the second secure image.

Figure 6A:
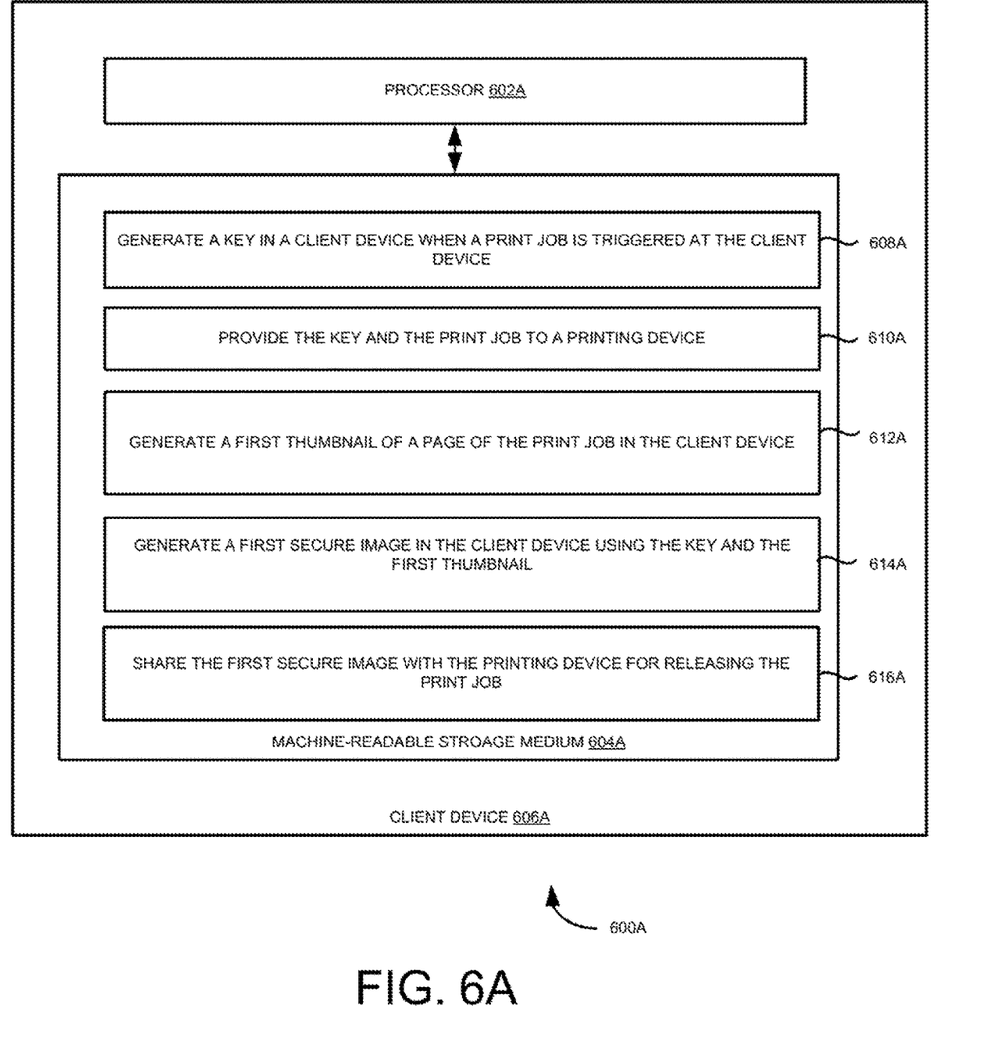
FIGS. 6A and 6B depict example block diagrams showing a non-transitory computer-readable media to securely release print jobs from a printing device.
Figure 6B:
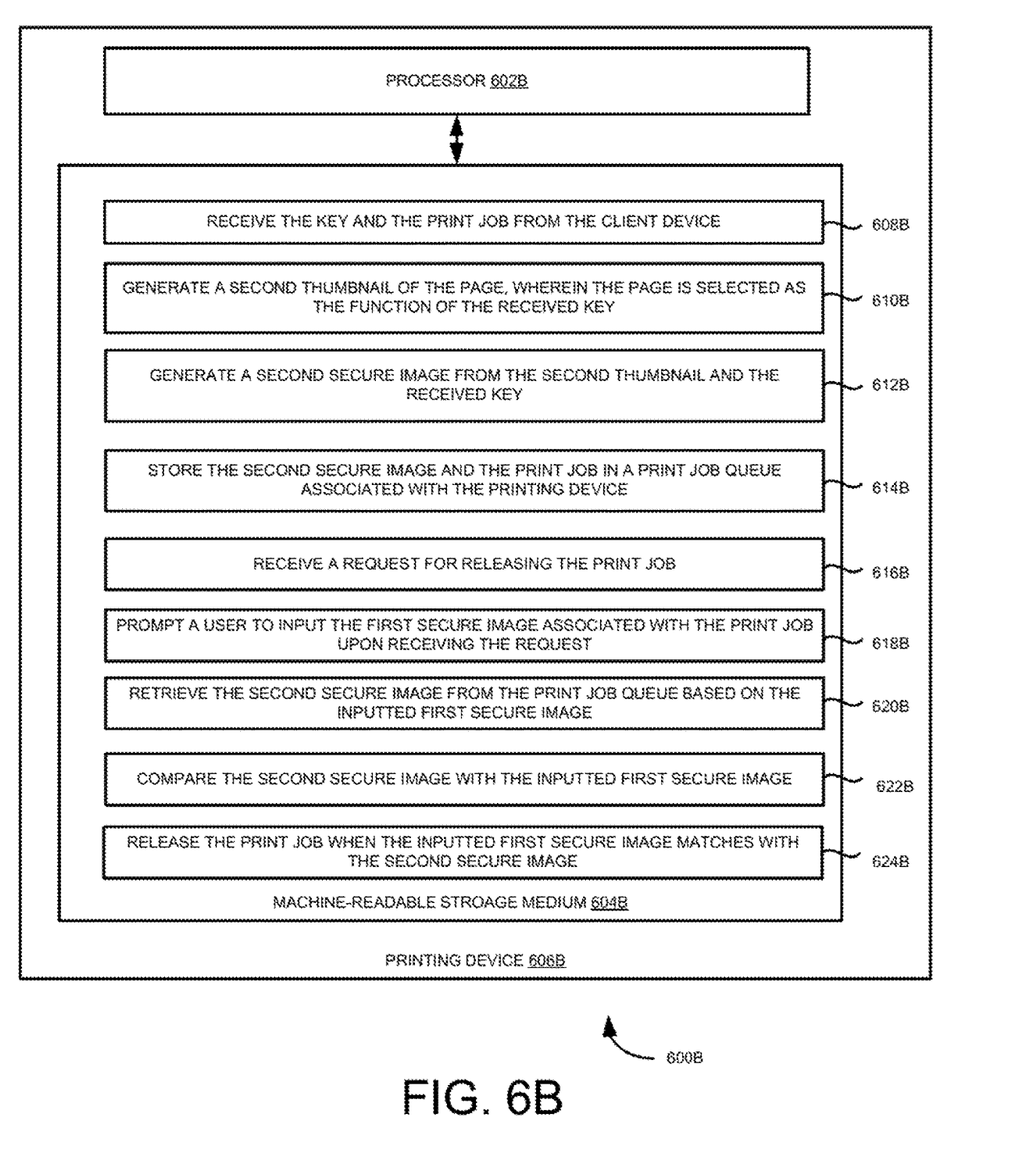

FIGS. 6A and 6B are example block diagrams 600A and 600B showing a non-transitory computer-readable media that stores code for operation in accordance with an example of the techniques of the present application. Particularly FIG. 6A illustrates client device side implementation (e.g., 600A) of an automation process for securely releasing a print job. FIG. 6B illustrates printing device side implementation (e.g., 600B) of an automation process for securely releasing the print job. Non-transitory computer-readable media includes a machine readable storage medium 604A on client device 606A and machine readable storage medium 604B on printing device 606B. Non-transitory computer-readable media may be generally referred by the reference numbers 604A and 604B and may be included in a computing system such as client device 606A and/or printing device 606B, respectively. Non-transitory computer-readable media 604A and 604B may correspond to any storage device that stores computer-implemented instructions, such as programming code and the like. For example, non-transitory computer-readable media 604A and 604B may include non-volatile memory, volatile memory, and/or storage devices. Examples of non-volatile memory include, but are not limited to, electrically erasable programmable Read Only Memory (EEPROM) and Read Only Memory (ROM). Examples of volatile memory include, but are not limited to, Static Random Access Memory (SRAM), and dynamic Random Access Memory (DRAM). Examples of storage devices include, but are not limited to, hard disk drives, compact disc drives, digital versatile disc drives, optical drives, and flash memory devices.

Processors 602A and 602B generally retrieve and execute the instructions stored in a non-transitory computer-readable media 604A and 604B, respectively, to operate the present techniques in accordance with an example. In one example, the tangible, computer-readable media 604A and 604B can be accessed by the respective one of processors 602A and 602B over a bus.

Machine-readable storage media 604A may store instructions 608A-616A. In an example, instructions 608A-616A may be executed by processor 602A on client device 606A to provide a mechanism for client device side implementation of the automation process as described in FIG. 4A.

Machine-readable storage media 604B may store instructions 608B-624B. In an example, instructions 608B-624B may be executed by processor 602B on the printing device 606B to provide a mechanism for printing device side implementation of the automation process to secure release of print jobs as described in FIG. 4B.

As used herein, a "processor" may include processor resources such as at least one of a Central Processing Unit (CPU), a semiconductor-based microprocessor, a Graphics Processing Unit (GPU), a Field-Programmable Gate Array (FPGA) to retrieve and execute instructions, other electronic circuitry suitable for the retrieval and execution instructions stored on a computer-readable medium, or a combination thereof. The processor fetches, decodes, and executes instructions stored on computer-readable medium to perform the functionalities described below. In other examples, the functionalities of any of the instructions of computer-readable media 604A and 604B may be implemented in the form of electronic circuitry, in the form of executable instructions encoded on a computer-readable storage medium, or a combination thereof.

As used herein, a "computer-readable medium" may be any electronic, magnetic, optical, or other physical storage apparatus to contain or store information such as executable instructions, data, and the like. For example, any computer-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any computer-readable medium described herein may be non-transitory. In examples described herein, a computer-readable medium or media may be part of an article (or article of manufacture). An article or article of manufacture may refer to any manufactured single component or multiple components. The medium may be located either in the system executing the computer-readable instructions, or remote from but accessible to the system (e.g., via a computer network) for execution. In the example of FIGS. 6A and 6B, each of computer-readable media 604A and 604B may be implemented by one computer-readable medium, or multiple computer-readable media.

In examples described herein, devices, such as computing devices and printing devices, may communicate with each other via a network interface device. In examples described herein, a "network interface device" may be a hardware device to communicate over at least one computer network. In some examples, a network interface may be a Network Interface Card (NIC) or the like. As used herein, a computer network may include, for example, a Local Area Network (LAN), a Wireless Local Area Network (WLAN), a Virtual Private Network (VPN), the Internet, or the like, or a combination thereof. In some examples, a computer network may include a telephone network (e.g., a cellular telephone network).

In some examples, instructions may be part of an installation package that, when installed, may be executed by processors 602A and 602B to implement the functionalities described herein in relation to instructions. In such examples, computer-readable media 604A and 604B may be a portable medium, such as a CD, DVD, or flash drive, or a memory maintained by a server from which the installation package can be downloaded and installed. In other examples, instructions may be part of an application, applications, or component(s) already installed on client device 606A and printing device 606B including processors 602A and 602B, respectively. In such examples, computer-readable media 604A and 604B may include memory such as a hard drive, solid state drive, or the like.

It may be noted that the above-described examples of the present solution may be for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the procedures of any method or process so disclosed, may be combined in any combination, except combinations where at least some of such features and/or procedures are mutually exclusive.

The terms "include," "have," and variations thereof, as used herein, have the same meaning as the term "comprise" or appropriate variation thereof. Furthermore, the term "based on," as used herein, means "based at least in part on." Thus, a feature that may be described as based on some stimulus can be based on the stimulus or a combination of stimuli including the stimulus.

The present description has been shown and described with reference to the foregoing examples. It may be understood, however, that other forms, details, and examples can be made without departing from the spirit and scope of the present subject matter that is defined in the following claims.

What is claimed is:

1. A client device comprising:
a processor;
a memory storing program instructions that are executable by the processor to:
generate a key corresponding to a print job when the print job is requested by the client device;
generate a first thumbnail of a page of the print job, wherein the page is selected based on the key;
generate a first secure image using the first thumbnail and the key;
provide the key and the print job to a printing device for printing; and
share the first secure image with the printing device, wherein the printing device is to verify the first secure image using the provided key and release the print job corresponding to the first secure image upon successful verification.

2. The client device of claim 1, wherein the instructions are further executable by the processor to:
encode the key; and
generate the first secure image by embedding the encoded key within the first thumbnail.

3. The client device of claim 1, wherein the instructions are further executable by the processor to:
determine whether the client device is a mobility device, wherein the mobility device is a device that can be carried to the printing device;
when the client device is the mobility device, enable to share the first secure image to the printing device using the client device; and
when the client device is not the mobility device, prompt to transfer the first secure image from the client device to a portable device and share the first secure image to the printing device using the portable device.

4. The client device of claim 3, wherein the instructions are further executable by the processor to determine whether the client device is the mobility device based on a combination of parameters, wherein the parameters are selected from the group consisting of a display screen size of the client device in comparison with a scanner bed of the printing device, operating system of the client device, a mobile device identifier, and type of in-built motion sensors of the client device.

5. The client device of claim 3, wherein the first secure image is transferred from the client device to the portable device using one of a wired connection, a Wi-Fi connection, a near field communication (NFC), Bluetooth, and an image capturing device, and wherein the first secure image is shared from the one of the client device and the portable device to the printing device using one of a wired connection, a Wi-Fi connection, a near field communication (NFC), Bluetooth, an image capturing device and scanner.

6. The client device of claim 1, wherein the printing device is to verify the first secure image using the provided key by:
  receiving the key and the print job from the client device;
  generating a second thumbnail of the page, wherein the page is determined as the function of the received key;
  generating a second secure image using the second thumbnail and the received key;
  obtaining the first secure image associated with the print job;
  comparing the first secure image with the second secure image; and
  releasing the print job when the first secure image matches with the second secure image.

7. A printing device comprising:
  a processor;
  a memory storing program instructions that are executable by the processor to:
    receive a key and a print job from a client device;
    determine a page of the print job based on the received key;
    generate a first thumbnail of the determined page;
    generate a first secure image by embedding the key into the first thumbnail;
      enable to input a second secure image associated with the print job from one of the client device and a portable device;
      compare the second secure image with the first secure image; and
      execute the print job when the second secure image matches with the first secure image.

8. The printing device of claim 7, wherein the instructions are further executable by the processor to enable to input the second secure image from the one of the client device and the portable device using one of a wired connection, a Wi-Fi connection, a near field communication (NFC), Bluetooth, an image capturing device and scanner.

9. The printing device of claim 7, wherein the key comprises at least one of a random number, text, and image, and wherein the key is generated using parameters selected from a group consisting of a time stamp, Internet protocol (IP) address, and identifiers associated with the client device.

10. A method comprising:
  generating a key in a client device when a print job is triggered at the client device;
  providing the key and the print job to a printing device;
  generating a first thumbnail of a page of the print job in the client device, wherein the page is determined as a function of the key;
  generating a first secure image in the client device using the key and the first thumbnail; and
  sharing the first secure image with the printing device, wherein the first secure image is verified by the printing device using the provided key and the print job is released upon successful verification.

11. The method of claim 10, wherein sharing the first secure image with the printing device, comprises:
  detecting a mobility capability of the client device;
  prompting to select one of the client device and a portable device based on the detected mobility capability; and
  sharing the first secure image with the printing device using the selected one of the client device and the portable device.

12. The method of claim 11, wherein the mobility capability of the client device is determined based on a combination of parameters, wherein the parameters are selected from the group consisting of a display screen size of the client device in comparison with a scanner bed of the printing device, operating system of the client device, a mobile device identifier, and type of in-built motion sensors of the client device.

13. The method of claim 11, wherein the first secure image is shared from the one of the client device and the portable device to the printing device using a connection, wherein the connection comprises one of a wired connection, a Wi-Fi connection, a near field communication (NFC), Bluetooth, an image capturing device, and scanner.

14. The method of claim 10, wherein the printing device verifies the first secure image using the provided key by:
  receiving the key and the print job from the client device;
  generating a second thumbnail of the page, wherein the page is selected as the function of the received key;
  generating a second secure image from the second thumbnail and the received key;
  storing the second secure image and the print job in a print job queue associated with the printing device; and
  verifying the first secure image using the second secure image and releasing the print job upon successful verification.

15. The method of claim 14, wherein verifying the first secure image using the second secure image comprises:
  receiving a request to release the print job;
  prompting a user to input the first secure image associated with the print job upon receiving the request;
  retrieving the second secure image from the print job queue based on the inputted first secure image;
  comparing the second secure image with the inputted first secure image; and
  releasing the print job when the inputted first secure image matches with the second secure image.

16. The method of claim 10, wherein generating the first secure image comprises:
  embedding the key within the first thumbnail.

* * * * *